(12) United States Patent
Stallard

(10) Patent No.: US 6,574,055 B1
(45) Date of Patent: Jun. 3, 2003

(54) METHOD AND APPARATUS FOR EFFECTING A TEMPERATURE COMPENSATION MOVEMENT

(75) Inventor: Charles R. Stallard, Kemp, TX (US)

(73) Assignee: Raytheon Company, Lexington, MA (US)

( * ) Notice: Subject to any disclaimer, the term of this patent is extended or adjusted under 35 U.S.C. 154(b) by 51 days.

(21) Appl. No.: 09/973,104

(22) Filed: Oct. 8, 2001

(51) Int. Cl.⁷ .................................................. G02B 7/02
(52) U.S. Cl. ........................................ 359/820; 126/700
(58) Field of Search ................. 359/820, 819; 126/700, 571

(56) References Cited

U.S. PATENT DOCUMENTS

| | | | | |
|---|---|---|---|---|
| 4,541,415 A | * | 9/1985 | Mori ........................... | 126/700 |
| 4,717,227 A | * | 1/1988 | Mori ........................... | 126/700 |
| 4,850,674 A | * | 7/1989 | Hasselskog ................. | 359/820 |
| 5,557,474 A | | 9/1996 | McCrary | |
| 6,040,950 A | * | 3/2000 | Broome ....................... | 359/820 |
| 6,108,145 A | * | 8/2000 | McCrary ..................... | 359/820 |
| 6,292,312 B1 | * | 9/2001 | Broome ....................... | 359/820 |

* cited by examiner

Primary Examiner—Loha Ben
(74) Attorney, Agent, or Firm—William C. Schubert; Glenn H. Lenzen, Jr.

(57) ABSTRACT

An athermalization compensation device (26, 126, 226) includes a frustoconical outer ring (51, 251), with opposite edge portions (53, 54, 253) offset radially and axially, and with a relatively low coefficient of thermal expansion. An inner ring (52, 252) has a relatively high coefficient of thermal expansion. In response to a temperature change, the inner ring exerts on the radially inner edge of the outer ring a force which flexes the outer ring so that the inner edge moves radially and axially in relation to the outer edge, in a manner which changes an axial dimension of the device. In an alternative embodiment, the outer ring has circumferentially spaced slots (264) extending into it from its radially inner edge, and the inner ring has a respective portion (281) disposed in each slot.

22 Claims, 4 Drawing Sheets

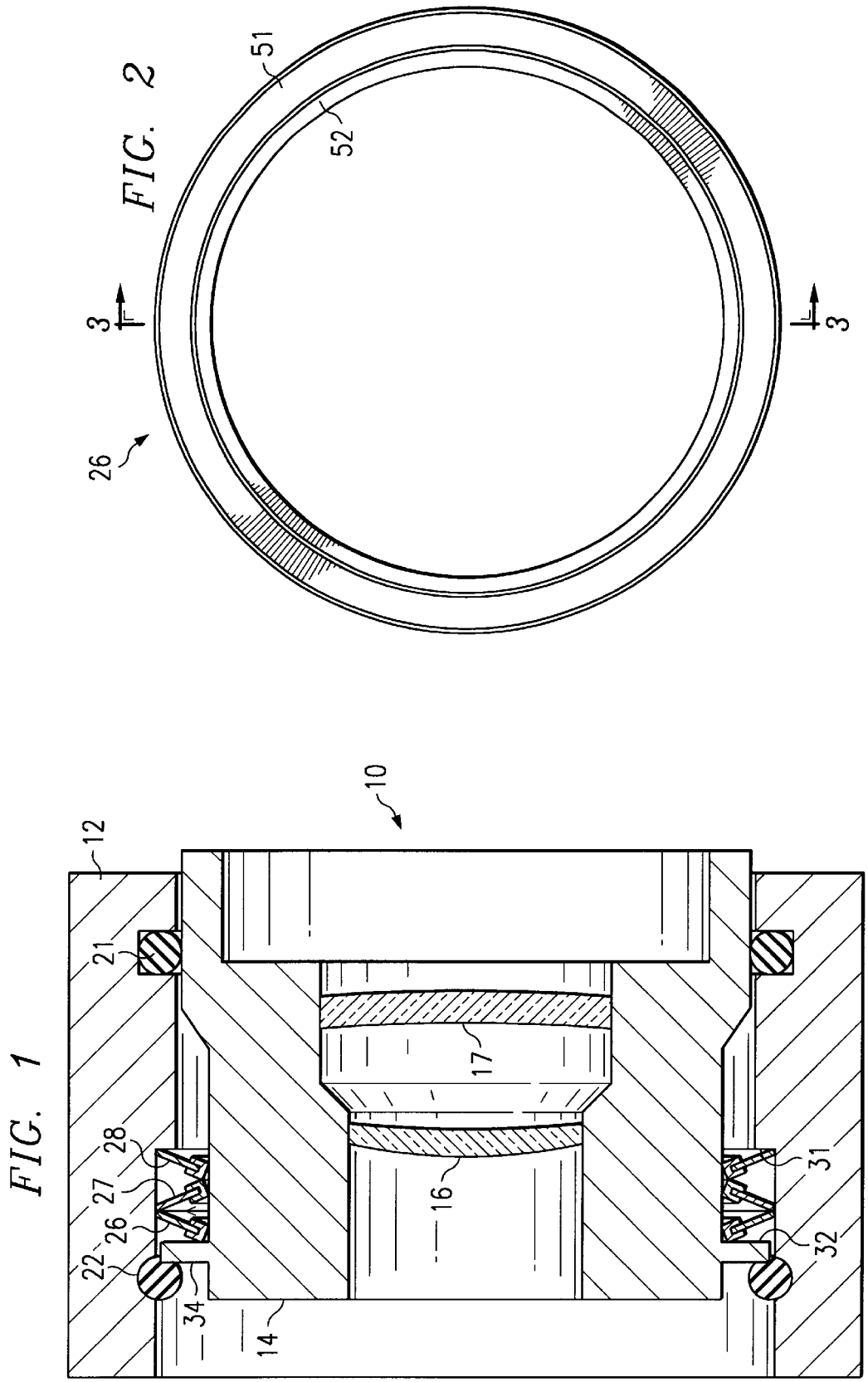

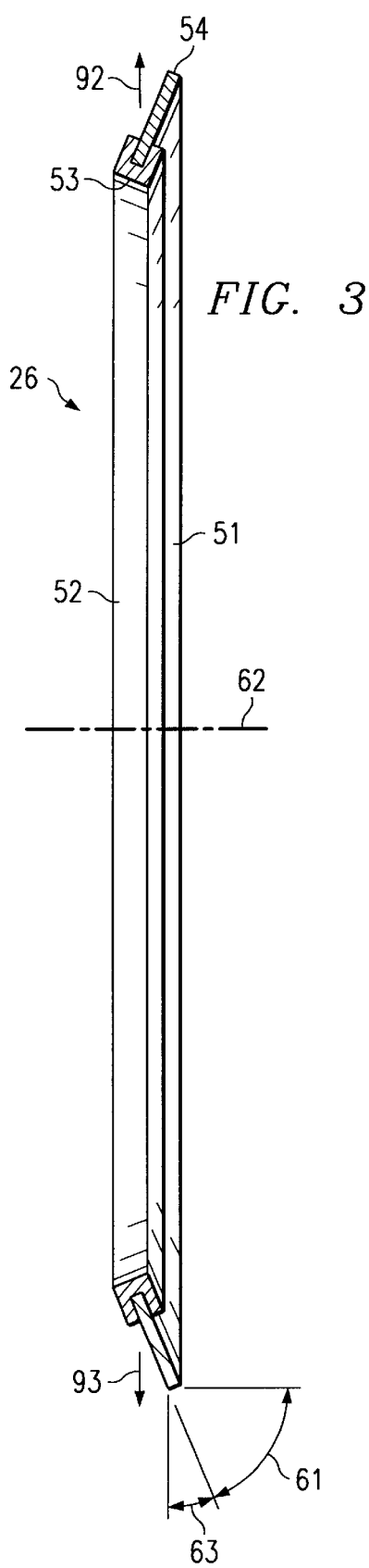
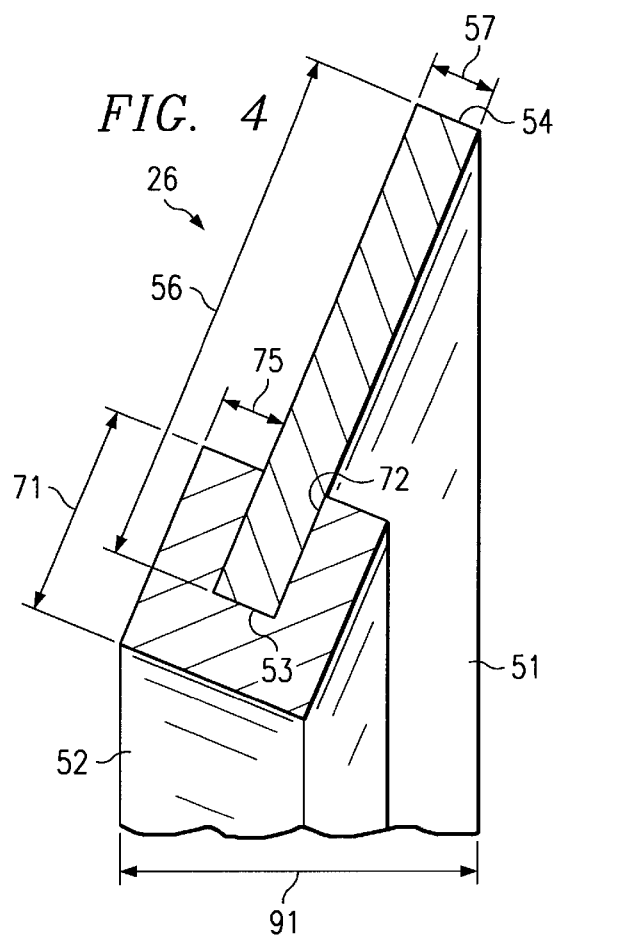
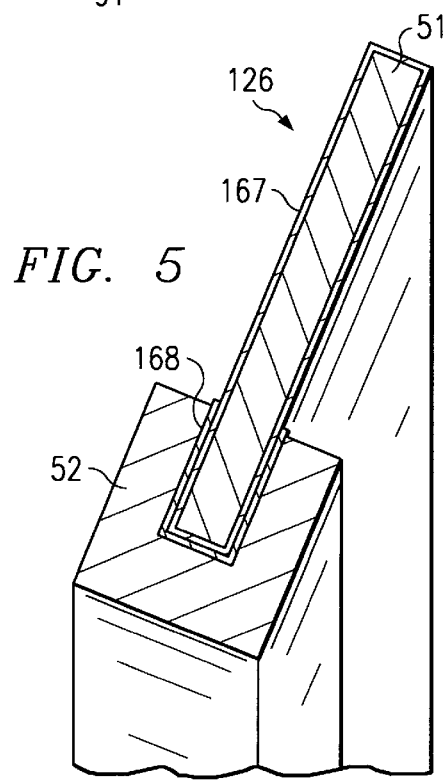

METHOD AND APPARATUS FOR EFFECTING A TEMPERATURE COMPENSATION MOVEMENT

TECHNICAL FIELD OF THE INVENTION

This invention relates in general to techniques for physically moving a part in response to temperature variations in order to maintain accurate alignment and operation and, more particularly, to such techniques which provide a relatively large physical movement for a given temperature change.

BACKGROUND OF THE INVENTION

There are a variety of types of systems which must operate properly over a relatively wide temperature range. In order for some of these systems to operate properly throughout the temperature range of interest, the position of a part therein must be adjusted physically with respect to other parts in response to temperature changes. One example is an optical assembly, in which it is often necessary to respond to temperature variations by adjusting the position of one optical component such as a lens in relation to other optical components, for example to maintain an accurate focus throughout the temperature range. Consequently, it is common in this type of optical assembly to provide some form of "athermalization" compensation structure that will effect a progressive positional adjustment of the lenses in response to progressive variations in temperature.

Where the appropriate rate of relative movement is small, it is possible to provide a single compensation component which supports the moveable part (such as a lens) for movement relative to other parts, and which has a coefficient of thermal expansion (CTE) selected to effect relative movement between the parts at the appropriate rate in response to temperature changes.

Where a somewhat higher rate of relative movement is desired, more sophisticated compensation devices have been developed, including a "tube-in-a-tube" approach in which two tubes with different CTEs are provided in a nested arrangement, with the tubes fixedly coupled to each other at one end, and with each tube coupled at the other end to a respective one of the two parts that are to be subjected to relative movement. However, this tube-in-a-tube approach is not particularly physically compact in the direction of relative movement, especially as the required rate of relative movement increases. This can be obviated to some extent by concentrically nesting several pairs of these tubes. However, the resulting arrangement is physically complex and relatively large in size, and has a relatively large weight that is disadvantageous in certain applications such as an airborne or space-based application. A further disadvantage of this arrangement is that it has several tolerances in a radial direction which can cumulatively produce significant inaccuracy, and has several tolerances in an axial direction which can cumulatively produce significant inaccuracy.

In an attempt to overcome the drawbacks discussed above, a more recent known approach uses a series of cooperating wedge rings, an example of which is disclosed in McCrary U.S. Pat. No. 5,557,474. While this approach has been generally adequate for its intended purposes, it has not been satisfactory in all respects. In this regard, the various wedge parts have an inherent degree of looseness or play between them, which can lead to inaccuracies in their ability to effect relative positioning of other parts in response to temperature changes. Further, friction between sliding surfaces on the wedge rings can resist smooth sliding movement between these surfaces, thus giving the temperature compensation movement a somewhat non-linear or "stepped" effect. Still another consideration is that this known compensation mechanism has, in the direction of compensation movement, an overall physical dimension which is significantly larger than the space available in some types of systems.

SUMMARY OF THE INVENTION

From the foregoing it may be appreciated that a need has arisen for a method and apparatus for effecting relative movement of two parts in response to temperature changes, in a manner which avoids some or all of the disadvantages of the preexisting devices that have been discussed above. According to the present invention, a method and apparatus are provided to address this need, and involve a device with first and second members respectively having a first coefficient of thermal expansion and a second coefficient of thermal expansion greater than the first coefficient, the first member having first and second portions that are offset with respect to each other in a direction parallel to a compensation direction and also in a direction perpendicular to the compensation direction. The second member responds to a temperature change by cooperating with the first member so as to effect movement of the first portion relative to the second portion in a direction transverse to the compensation direction, in a manner changing a dimension of the device in a direction parallel to the compensation direction.

BRIEF DESCRIPTION OF THE DRAWINGS

A better understanding of the present invention will be realized from the detailed description which follows, taken in conjunction with the accompanying drawings, in which:

FIG. 1 is a diagrammatic sectional side view of part of an optical apparatus that includes several athermalization compensation devices which each embody aspects of the present invention;

FIG. 2 is a diagrammatic front view of one of the athermalization compensation devices from the embodiment of FIG. 1;

FIG. 3 is a diagrammatic sectional view taken along the line 3—3 in FIG. 2;

FIG. 4 is a diagrammatic sectional view which shows, in an enlarged scale, an upper portion of the structure depicted in FIG. 2;

FIG. 5 is a diagrammatic fragmentary sectional view similar to FIG. 4, but showing an athermalization compensation device which is an alternative embodiment of the device of FIGS. 2–4;

DETAILED DESCRIPTION

Figure 6:
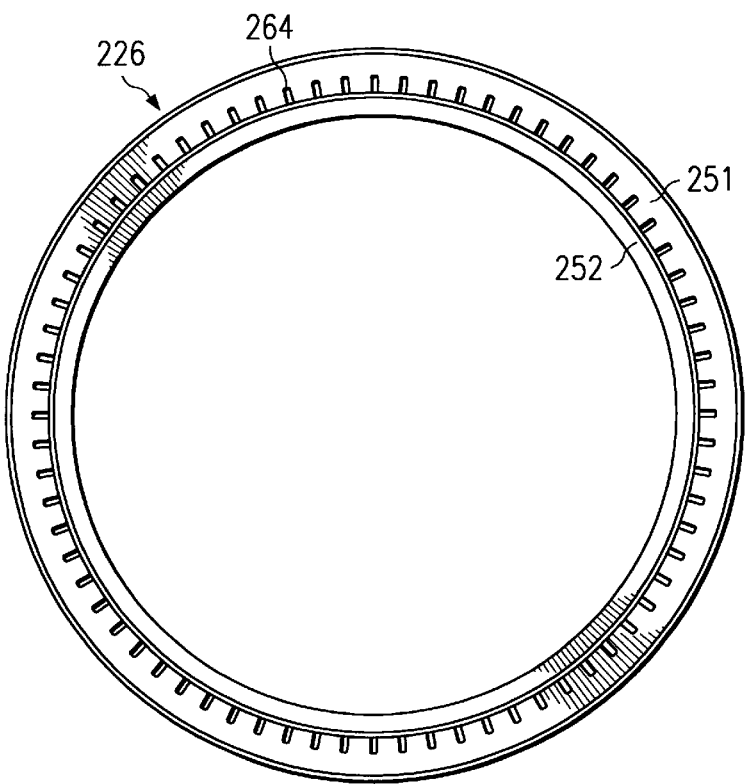
FIG. 6 is a diagrammatic front view similar to FIG. 2, but showing an athermalization compensation device which is still another alternative embodiment of the device of FIGS. 2–4.

FIG. 1 is a diagrammatic sectional side view of an apparatus 10 which is part of an optical system and which embodies aspects of the present invention. The apparatus 10 includes a tubular housing 12, and a sleeve 14 which is supported within the housing 12 for axial movement relative thereto. The sleeve 14 supports two optical lenses 16 and 17. Two resilient O-rings 21 and 22 are supported in respective grooves provided in the inner surface of the housing 12, and the sleeve 14 has an exterior surface which slidably engages the ring 21 in order to facilitate the support of the sleeve 14 for sliding movement with respect to the housing 12.

The apparatus 10 of FIG. 1 is designed for use in a not-illustrated optical system, which must operate accurately across a relatively wide temperature range. In order to maintain proper optical focus within the system during operational use, the position of the sleeve 14 supporting the lenses 16–17 must be adjusted with respect to the housing 12 in response to temperature changes. In this regard, the sleeve 14 in the disclosed embodiment has an outside diameter which is roughly 1 inch, and the sleeve 14 needs to move about 50 microinches per ° C. in order to maintain proper system operation, which is a relatively large rate of axial athermalization movement. Further, due to size constraints, an athermalization compensation arrangement provided to effect this athermalization movement needs to fit within about 0.6 inch of axial space, which is a relatively small amount of axial space.

In order to effect this athermalization movement of the sleeve 14, the disclosed embodiment includes three athermalization compensation devices 26, 27, and 28. The devices 26–28 are each annular, and each encircle the sleeve 14. The devices 26–28 collectively form a stack which has one axial end engaging an annular shoulder 31 provided on the housing 12, and the other axial end engaging an annular shoulder 32 provided on the sleeve 14. The sleeve 14 has an annular surface 34 which engages the resilient O-ring 22, and the O-ring 22 urges the sleeve 14 rightwardly in FIG. 1 with respect to the housing 12. In this regard, the O-ring 22 is not provided to effect a seal between two different parts, but instead to apply a resilient force to the sleeve 14.

In response to a progressive decrease in the ambient temperature, the devices 26–28 each contract in axial dimension, in a manner discussed later, which permits the resilience of the O-ring 22 to progressively slide the sleeve 14 to the right in FIG. 1 with respect to the housing 12. This keeps the devices 26 and 28 respectively in engagement with the surfaces 32 and 31. In contrast, when the temperature progressively increases, the devices 26–28 expand in axial dimension, thereby forcing the sleeve 14 to move progressively leftwardly in FIG. 1 with respect to the housing 12, against the resilient urging of the O-ring 22.

It would optionally be possible to provide between the devices 26–27 a not-illustrated shim in the shape of a washer, so that the devices 26–27 each engage the shim rather than each other. Similarly, it would optionally be possible to provide a shim between the devices 27–28. For purposes of clarity, however, these optional shims have been omitted in FIG. 1. The shims would reduce potential wear on the devices 26–28, for example where a corner on the device 27 would otherwise engage a corner on the device 28. Further, by selecting a shim from among several different shims having different axial thicknesses, the position of the sleeve 14 relative to the housing 12 at a given temperature can be fine-tuned from system to system so that the lenses 16 and 17 in each system provide an accurate optical focus.

In the disclosed embodiment, the athermalization compensation devices 26–28 are all identical. Therefore, only one of these three devices is illustrated and described in detail, in particular the device 26. In this regard, FIG. 2 is a diagrammatic front view of the device 26, and FIG. 3 is a sectional side view of the device 26, taken along the line 3-3 in FIG. 2. FIG. 4 is a diagrammatic fragmentary sectional side view of the uppermost portion of FIG. 2, shown in a significantly larger scale. As best seen in FIG. 3, the device 26 has approximately the shape of a frustoconical washer. The device 26 includes an outer ring 51 of frustoconical shape, and an inner ring 52 which cooperates with a radially inner edge of the outer ring 51, as discussed in more detail later.

In the disclosed embodiment, the outer ring 51 is made from an invar material, which is a known nickel-iron alloy. In more detail, the disclosed embodiment uses an invar material having a compensation by weight of 63% iron, 36% nickel, 0.35% manganese, 0.2% silicon, and 0.02% carbon. An invar material with this compensation can be obtained commercially under the trademark INVAR 36® from Carpenter Technology Corporation of Wyomissing, Pa. This invar material has a relatively low coefficient of thermal expansion (CTE), which is $0.70 \times 10^{-6}$ inch/inch/° F.

The outer ring 51 has a radially inner edge 53, and a radially outer edge 54, and the edges 53 and 54 are offset axially. The outer ring 51 has, in a direction from the inner edge 53 to the outer edge 54, a width dimension 56 which is approximately 0.077 inch in the disclosed embodiment. The outer ring 51 has a thickness dimension 57 of approximately 0.01 inch, and has an outside diameter of approximately 1.078 inches. With reference to FIG. 3, the outer ring 51 extends at an angle 61 of 75° with respect to a center axis 62 of the outer ring 51, which can also be expressed as an angle 63 of approximately 15° with respect to a plane perpendicular to the axis 62. The specific angle value of 15° given here for the angle 63 represents the size of the angle at room temperature. The size of this angle will change somewhat during normal operation, as discussed later. It would alternatively be possible to use a different value for the angle 63, within a range of approximately 10° to approximately 45° at room temperature.

The inner ring 52 has a cross-sectional shape which is approximately a square, with a dimension 71 of approximately 0.030 inch on each side. An annular groove 72 of rectangular cross section extends radially into the inner ring 52 from a side thereof which faces approximately radially outwardly. In the disclosed embodiment, the groove 72 has a width of approximately 0.01 inch, and a depth of approximately 0.02 inch. Thus, viewed in cross section, the inner ring 52 is approximately U-shaped, and has two legs and a bight that have a uniform thickness of approximately 0.01 inch, for example as indicated at 75. The groove 72 receives the radially inner edge portion of the outer ring 51, with the edge 53 of the outer ring 51 engaging the radially inner end of the groove 72.

The inner ring 52 is formed by electroplating a bronze material onto the radially inner edge portion of the outer ring 51. In the disclosed embodiment, the bronze material is a manganese bronze which is commercially available as UNS C67500, which has a relatively high CTE of $11.8 \times 10^{-6}$ inch/inch/° F., and which has a composition by weight of 58.5% copper, 39% zinc, 1.4% iron, 1.0% tin, and 0.1% manganese. Alternatively, it would be possible to use a brass material which is commercially available as UNS C11000, and which has a relatively high CTE of $11.4 \times 10^{-6}$ inch/inch/° F. The overall axial dimension of the device 26 at room temperature is about 0.041 inch in the disclosed embodiment, but this dimension changes in response to temperature changes, as discussed below. The stack of three devices 26–28 thus has an overall axial dimension of about 0.123 inch, which changes with temperature variations, and which is substantially less than the axial space of 0.6 inch available for a temperature compensation arrangement in the apparatus 10 of FIG. 1.

The operation of the athermalization compensation device of FIGS. 2–4 will now be briefly explained. As mentioned above, and with reference to FIG. 4, the device 26 has an overall axial dimension 91 of 0.041 inch at room temperature, which varies in response to temperature changes. In more detail, and as mentioned above, the outer ring 51 has a relatively low CTE, whereas the inner ring 52 has a relatively high CTE. Therefore, if the ambient temperature increases from room temperature, the inner ring 52 will attempt to expand radially outwardly at a significantly faster rate than the outer ring 51. Consequently, the inner ring 52 will exert, all along the circumference of the radially inner edge 53 of the outer ring 51, a force which is directed radially outwardly, for example as indicated diagrammatically by arrows 92 and 93 in FIG. 3. This strong radial force exerted on the radially inner edge 53 of the outer ring 51 will cause the radially inner edge 53 of the outer ring 51 to tend to expand radially outwardly at a somewhat higher rate than the radially outer edge 54 of the ring 51. Due to the geometry of the device, the radially inner edge 53 must move axially with respect to the outer edge 54 in order to also move radially with respect to it.

In essence, therefore, the outer ring 51 is flexed somewhat, in a manner which causes a small change in the cone angle of the frustoconical ring 51, in particular by increasing the angle 63, which of course corresponds to a decrease in the angle 61. As a result, the effective axial length of the outer ring 51 will increase, which in turn will effectively increase the overall axial length 91 (FIG. 4) of the device 26. In the disclosed embodiment, for the materials and dimensions discussed above, the rate of change in the dimension 91 will be approximately $1.16 \times 10^{-5}$ inch/° C. With reference to FIG. 1, this effects sliding movement of the sleeve 14 leftwardly with respect to the housing 12, against the resilient urging of the O-ring 22.

In a similar manner, if the ambient temperature is decreased from room temperature, the inner ring 52 will attempt to contract at a faster rate than the outer ring 51, and will therefore exert, all along the circumference of the radially inner edge 53 of the outer ring 51, a radially inwardly directed force. This force will cause the radially inner edge portion 53 of the ring 51 to contract more rapidly than the radially outer edge portion 54 thereof. In essence, the outer ring 51 is flexed somewhat, in a manner which causes a small change in the cone angle of the frustoconical ring 51, in particular by decreasing the angle 63, which of course corresponds to an increase in the angle 61. As a result, the effective axial length of the outer ring 51 will decrease, which will in turn will effectively decrease the overall axial length 91 (FIG. 4) of the device 26. In the disclosed embodiment, for the materials and dimensions discussed above, the rate of change in the dimension 91 will be approximately $1.16 \times 10^{-5}$ inch/° C. With reference to FIG. 1, this permits the resilience of the O-ring 22 to slide the sleeve 14 rightwardly with respect to the housing 12.

FIG. 5 is a diagrammatic fragmentary sectional view similar to FIG. 4, but showing an athermalization compensation device 126 which is an alternative embodiment of the device 26 of FIGS. 2–4. The device 126 is identical to the device 26, except for the differences discussed below. The device 126 includes an outer ring 51 and an inner ring 52, which are identical to their counterparts in the device 26. The device 126 also includes a coating or layer 167 of nickel, which covers the entire outer surface of the outer ring 51. In the disclosed embodiment, the coating 167 has a thickness of approximately 0.0004 inch.

A further coating 168 is provided over a portion of the coating 167, in particular on the radially inner edge portion of the coating 167 on the outer ring 51. In the disclosed embodiment, the coating 168 is made of copper, and has a thickness of approximately 0.0004 inch. The nickel coating 167 has a CTE of $8.5 \times 10^{-6}$ inch/inch/° F., and the copper coating 168 has a CTE of $9.8 \times 10^{-6}$ inch/inch/° F. It will thus be noted that the CTE values increase progressively from layer to layer, with the CTE of the nickel coating 167 being greater than the CTE of the outer ring 51, the CTE of the copper coating 168 being greater than the CTE of the nickel coating 167, and the CTE of the inner ring 52 being greater than the CTE of the copper coating 168.

When the device 126 is being fabricated, the outer ring 51 is formed, and then the coating 167 of nickel is electroplated over the entire exterior surface of the outer ring 51. Then, the radially outer portion of the coating 167 is masked, and the coating 168 of copper is electroplated over the exposed inner edge portion of the coating 167. Finally, the inner ring 52 is electroplated onto the copper layer 168.

The nickel layer 167 provides a degree of corrosion protection to the iron-based invar material of the outer ring 51. Further, as noted above, the copper coating 168 has a CTE which is less than the CTE of the inner ring 52 and greater than the CTE of the coating 167, and the coating 167 has a CTE which is greater than the CTE of the outer ring 51. Consequently, in the region of the coating 168, the coatings 167 and 168 provide a cushioning or "matching" effect between the CTEs of the inner ring 52 and outer ring 51. As a result, the device 126 can, in comparison to the device 26 of FIGS. 2–4, operate over a slightly wider temperature range before reaching a high or low temperature value at which differences in CTEs of adjacent materials would cause physical damage.

FIG. 6 is a diagrammatic front view of an athermalization compensation device 226 which is a further alternative embodiment of the device 26 of FIGS. 2–4. The device 226 is identical to the device 26, except for the differences discussed below.

Figure 7:
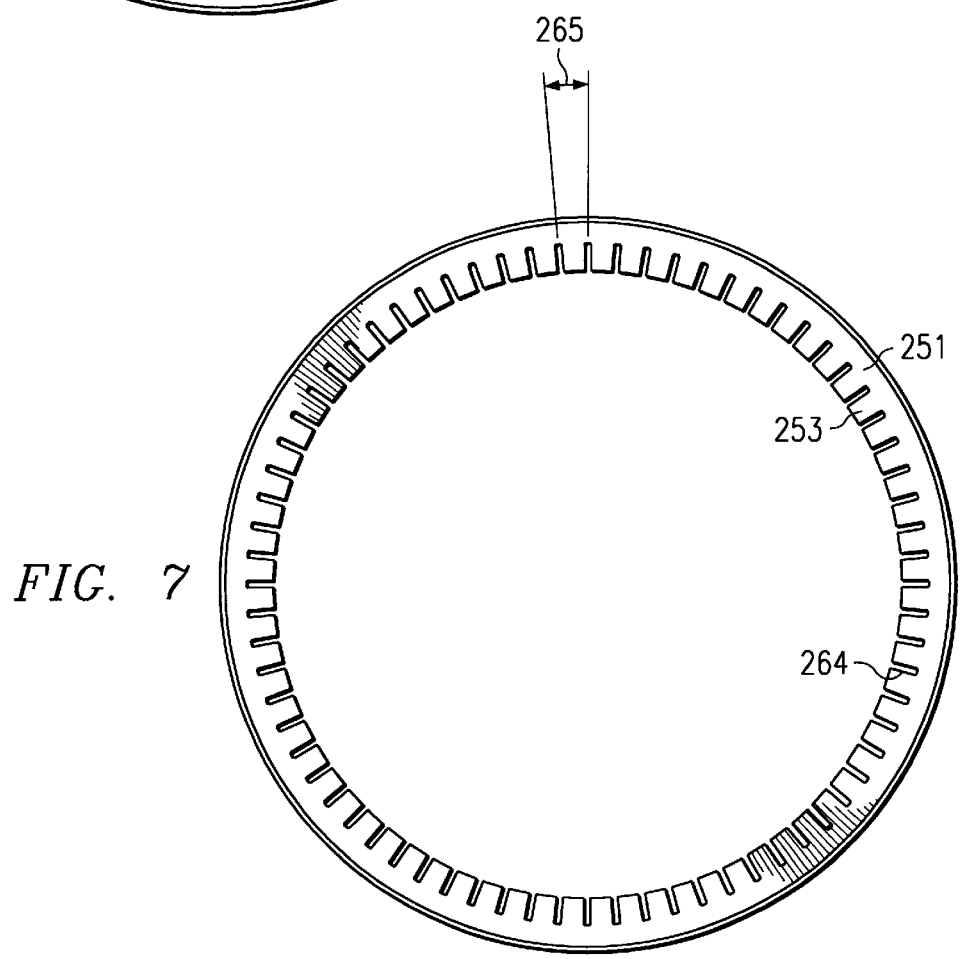
FIG. 7 is a diagrammatic front view of an outer ring which is a component of the device of FIG. 6.

The device 226 has an outer ring 251, and an inner ring 252. FIG. 7 is a diagrammatic front view of the outer ring 251. The outer ring 251 is identical to the outer ring 51 in FIGS. 2–4, except that it has 72 slots 264 which each extend radially outwardly into the ring 251 from the radially inner edge 253 thereof. The slots 264 are provided at uniformly spaced locations along the circumference of the inner edge 253, in particular so that adjacent slots are spaced by an angle 265 of approximately 5°.

Figure 8:
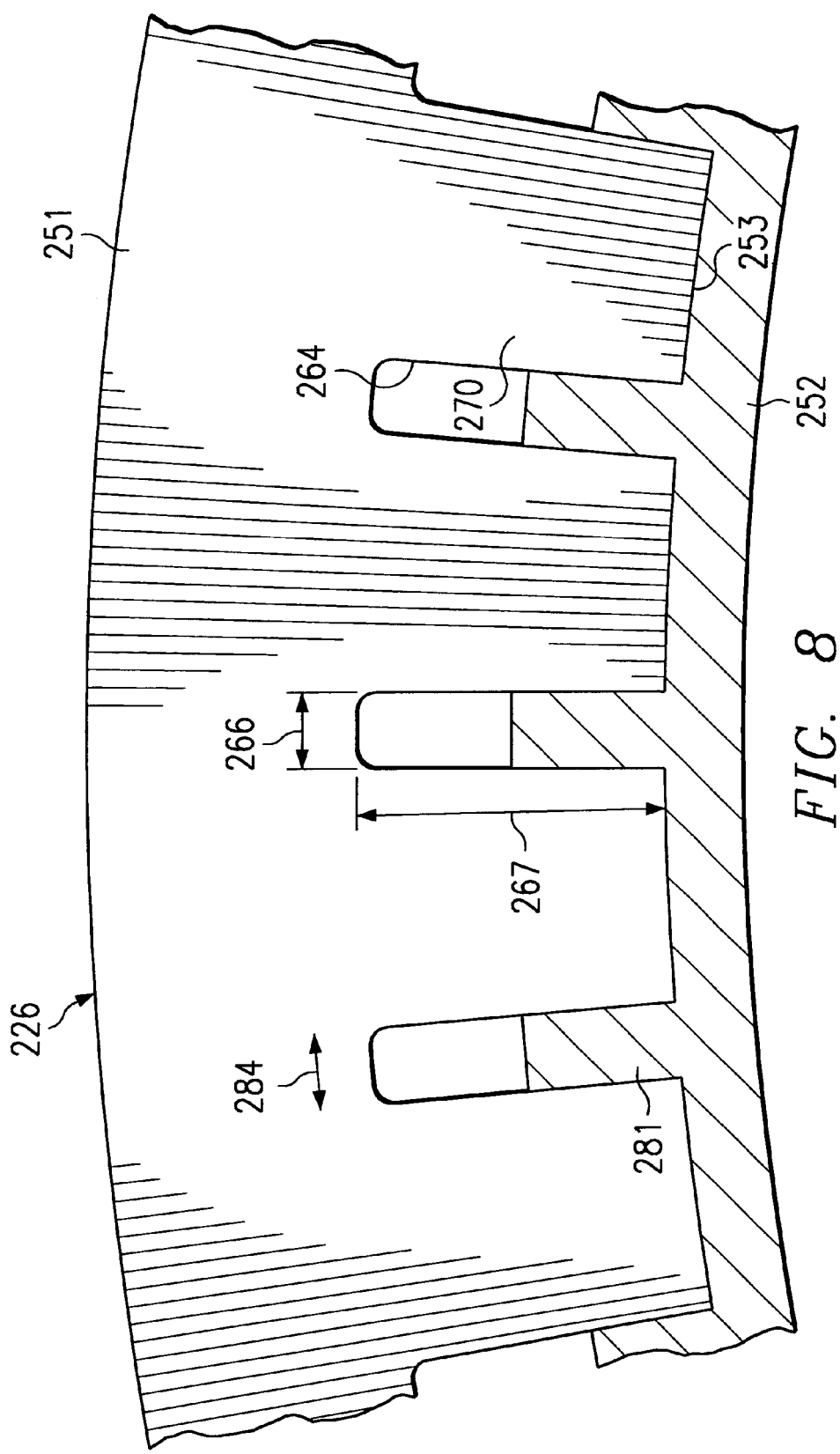
FIG. 8 is a diagrammatic fragmentary sectional view of a portion of the device of FIG. 6.

FIG. 8 is a diagrammatic fragmentary sectional view of the device 226. In the disclosed embodiment, the slots 264 each have a width 266 which is approximately 0.010 inch, and a length 267 which is approximately 0.040 inch. Each slot 264 thus extends radially across about half the width of the outer ring 251. In effect, the slots 264 define 72 tabs 270 that each project radially inwardly.

With reference to FIG. 8, the inner ring 252 is substantially identical to the ring 52 of FIGS. 2–4, except that the material of the inner ring 252 includes portions 281 that each fill the space between the outer ends of a respective adjacent pair of the tabs 270. Stated differently, the radially outer half of each slot 264 does not have any material therein, but the radially inner half of each slot 264 is filled with a respective portion 281 of the material of the inner ring 252. The portions 281 of the ring 252 are formed between the tabs by the electroplating process which forms the entire inner ring 252.

In a variation, the device 226 of FIGS. 6–8 can optionally have a thin coating of nickel on the outer ring 251, and a thin coating of copper over part of the nickel coating, in a manner similar to the nickel and copper coatings 167 and 168 shown in FIG. 5 for the device 126. These coatings on the ring 251 would, of course, be very thin in comparison the size of the outer ring 251, and in fact would be very thin in comparison the widths of the slots 264 in the outer ring. Consequently, the inner ring 252 would still have portions 281 disposed within the slots 264, in the same basic manner shown in FIG. 8, notwithstanding the presence of very thin coatings of nickel and copper on the surfaces of the ring 251 disposed within the slots 264.

In general, the operation of the device 226 of FIGS. 6–8 is similar to the operation of the device 26 of FIGS. 2–4. However, due to the presence of the slots 264, it is easier for the inner ring 252 to effect radial expansion or contraction of the radially inner edge portion 253 of the outer ring 251. This movement is further facilitated by the fact that, as the portions 281 of the inner ring disposed within the slots 264 expand and contract, they each exert expansion and contraction forces in circumferential directions on the adjacent tabs 270, in directions parallel to the double-headed arrow 284 in FIG. 8. These forces also help to effect radial expansion and contraction of the radially inner edge portion 253 of the outer ring 251. Consequently, the effective axial length of the device 226 can change by at least 50% more than that of the device 26, before either device reaches an upper or lower limit beyond which that device will experience physical damage. For the materials and dimensions discussed herein, the rate of change in the overall axial dimension of the device 226 will be approximately $1.91 \times 10^{-5}$ inch/° C.

The present invention provides a number of technical advantages. One such technical advantage is that each disclosed embodiment provides a relatively high amount of athermalization compensation movement for a given temperature change. A further advantage is that this is achieved with a structural arrangement which is extremely compact in the direction of compensation, and which in fact is about one-twentieth the size in the compensation direction of the smallest known pre-existing device that is capable of producing a comparable rate of compensation movement. Another advantage is that the disclosed devices are each extremely simple in structure.

A related advantage is that the disclosed devices each effect compensation in a passive manner, or in other words without the use of components such as electronic sensors and electric motors. A further advantage is that the disclosed devices are inexpensive. Still another related advantage is that, due to the simple structure and compact size of the disclosed devices, each disclosed device has only a minimal weight, which can be a significant factor in certain situations, such as applications used in airplanes and space vehicles.

Still another advantage is that, where the various portions of the device are assembled by electroplating, there is no inherent looseness, play or excess clearances that can contribute to alignment errors. The disclosed devices thus produce very smooth and uniform linear movement in response to changes in temperature.

Although selected embodiments have been illustrated and described in detail, it will be understood that various substitutions and alterations can be made therein without departing from the spirit and scope of the present invention. In this regard, the disclosed embodiments are set in the context of an optics system, but it will be recognized that the invention is applicable to a wide range of other types of systems. In addition, the foregoing discussion sets forth certain specific materials which are used in the disclosed embodiments, but it will be recognized that there are a variety of other materials which can be used for each of the parts of the disclosed devices. For example, the outer ring of the disclosed embodiments is made from an invar material, but it can alternatively be made from any other suitable material, including but not limited to tungsten or stainless steel. Similarly, the inner ring is made of bronze, but it could alternatively be made of any other suitable material, for example aluminum or copper.

A further consideration is that the foregoing discussion sets forth specific dimensions and angles for parts used in the disclosed embodiments, but it will be recognized that it is possible to vary the dimensions and/or angles without departing from the spirit and scope of the present invention. Moreover, it will be recognized that, by varying dimensions, materials, angles and/or other characteristics, it is possible to vary the operational and performance characteristics of the disclosed devices, for example to achieve a specific temperature compensation characteristic. For example, it is possible to vary the rate at which the devices expand and contract axially in response to temperature changes.

Still another consideration is that the disclosed devices are assembled by successively electroplating one or more types of material onto an outer ring. However, it will be recognized that it would be possible to assemble the device in some other manner which chemically bonds or mechanically couples various parts to each other. Other substitutions and alterations are also possible without departing from the spirit and scope of the present invention, as defined by the following claims.

What is claimed is:

1. An apparatus comprising a temperature compensation device which includes:

a first member having a first coefficient of thermal expansion and having first and second portions that are offset with respect to each other in a direction parallel to a compensation direction and in a direction perpendicular to said compensation direction; and a second member having a second coefficient of thermal expansion which is substantially greater than said first coefficient of thermal expansion, said second member cooperating with said first member so that, in response to a temperature change, said second member effects movement of said first portion relative to said second portion in a direction transverse to said compensation direction, in a manner changing a dimension of said device in a direction parallel to said compensation direction.

2. An apparatus according to claim 1, wherein said first member is annular and extends around an axis parallel to said compensation direction, said first and second portions thereof being offset radially and axially with respect to each other in relation to said axis; and wherein said second member, in response to a temperature change, effects said movement of said first portion relative to said second portion by flexing said first member so that said first portion moves axially in relation to said second portion in a manner changing said axial dimension of said device.

3. An apparatus according to claim 2, wherein said first and second portions of said first member are respectively a radially inner edge portion thereof and a radially outer edge portion thereof.

4. An apparatus according to claim 3,
wherein said second member is annular;
wherein said first portion of said first member is annular; and
wherein said second member engages said first portion of said first member along substantially the entire circumference thereof.

5. An apparatus according to claim 4, wherein said first member includes a frustoconical wall portion, said first and second portions of said first member being radially opposite annular edge portions of said wall portion, said wall portion extending between said first and second portions in an inclined direction which forms an angle with respect to said axis, and said wall portion having a width in said inclined direction which is substantially greater than a thickness thereof normal to said inclined direction.

6. An apparatus according to claim 5, wherein said first member has a plurality of circumferentially spaced slots which each extend approximately radially thereinto from said radially inner edge portion thereof.

7. An apparatus according to claim 6, wherein said second member has material thereof disposed in each said slot in said first member.

8. An apparatus according to claim 5, wherein said second member has an annular groove which receives said first portion of said first member.

9. An apparatus according to claim 4, wherein said second member is plated on said first portion of said first member.

10. An apparatus according to claim 4,
wherein said first member is made of an alloy containing primarily iron and nickel; and
wherein said second member is made substantially of bronze.

11. An apparatus according to claim 4, including between said first and second members a coating of a material having a third coefficient of thermal expansion which is greater than said first coefficient of thermal expansion and less than said second coefficient of thermal expansion.

12. An apparatus according to claim 11, including between said second member and said coating a coat of a material having a fourth coefficient of thermal expansion which is greater than said first coefficient of thermal expansion and less than said third coefficient of thermal expansion.

13. An apparatus according to claim 12,
wherein said first member is made of an alloy containing primarily iron and nickel;
wherein said second member is made substantially of bronze;
wherein said coating is made substantially of nickel; and
wherein said coat is made substantially of copper.

14. A method, comprising the steps of:
providing a device that includes first and second members respectively having a first coefficient of thermal expansion and a second coefficient of thermal expansion greater than said first coefficient of thermal expansion, said first member having first and second portions that are offset with respect to each other in a direction parallel to a compensation direction and in a direction perpendicular to said compensation direction; and
causing said second member to respond to a temperature change by cooperating with said first member so as to effect movement of said first portion relative to said second portion in a direction transverse to said compensation direction, in a manner changing a dimension of said device in a direction parallel to said compensation direction.

15. A method according to claim 14, wherein said step of providing said first member includes the step of configuring said first member to be annular and to be extending around an axis which is parallel to said compensation direction, said first and second portions being offset radially and axially with respect to each other in relation to said axis; and
wherein said step of causing said second member to respond to a temperature change includes the step of effecting said movement of said first portion relative to said second portion by flexing said first member so that said first portion moves axially in relation to said second portion in a manner changing said axial dimension of said device.

16. A method according to claim 15, including the steps of:
configuring said first member so that said first and second portions are respectively a radially inner edge portion thereof and a radially outer edge portion thereof;
configuring said second member to be annular;
configuring said first portion of said first member to be annular; and
causing said second member to engage said first portion of said first member along substantially the entire circumference thereof.

17. A method according to claim 16, including the step of configuring said first member to have a plurality of circumferentially spaced slots which each extend approximately radially into said first member from said radially inner edge portion thereof.

18. A method according to claim 17,
including the step of configuring said second member to have a plurality of portions of said material thereof which are each disposed in a respective said slot in said first member; and
wherein said step of causing said second member to respond to a temperature change includes the step of causing each said portion of said second member to exert one of an expansive and a contractive force on opposite side of said slot associated therewith.

19. A method according to claim 16, including the step of forming said second member by plating the material of said second member on said first portion of said first member.

20. A method according to claim 16, including the step of providing between said first and second members a coating of a material having a third coefficient of thermal expansion which is greater than said first coefficient of thermal expansion and less than said second coefficient of thermal expansion.

21. A method according to claim 20, including the step of providing between said second member and said coating a coat of a material having a fourth coefficient of thermal expansion which is greater than said first coefficient of thermal expansion and less than said third coefficient of thermal expansion.

22. A method according to claim 21, including the steps of:
forming said coating by plating the material of said coating on said first member;
forming said coat by plating the material of said coat on said coating; and
forming said second member by plating the material of said second member on coat.

* * * * *